United States Patent
Bell et al.

(10) Patent No.: US 11,880,818 B2
(45) Date of Patent: *Jan. 23, 2024

(54) TRANSACTION INTERFACE CONTROL

(71) Applicant: Block, Inc., San Francisco, CA (US)

(72) Inventors: Bruce Bell, New York, NY (US); Alexey Kalinichenko, San Francisco, CA (US); Logan Johnson, Brooklyn, NY (US); Nicholas Dower, San Francisco, CA (US); Raymond Ryan, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,193

(22) Filed: Dec. 9, 2019

(65) Prior Publication Data

US 2020/0184443 A1 Jun. 11, 2020

Related U.S. Application Data

(63) Continuation of application No. 15/188,711, filed on Jun. 21, 2016, now Pat. No. 10,504,092.

(51) Int. Cl.
*G06Q 20/00* (2012.01)
*G06Q 20/20* (2012.01)
(Continued)

(52) U.S. Cl.
CPC ......... *G06Q 20/204* (2013.01); *G06F 3/0481* (2013.01); *G06F 3/04842* (2013.01);
(Continued)

(58) Field of Classification Search
CPC .................................................. G06Q 20/20
(Continued)

(56) References Cited

U.S. PATENT DOCUMENTS

| 5,494,136 A | 2/1996 | Humble |
| 7,048,184 B2 | 5/2006 | Persky |

(Continued)

FOREIGN PATENT DOCUMENTS

| CA | 3027525 C | 5/2021 |
| GB | 2 427 059 A | 12/2006 |

(Continued)

OTHER PUBLICATIONS

Secure Mobile Payment on NFC-Enabled Mobile Phones Formally Analyzed Using CasperFDR; Published in: 2014 IEEE 13th International Conference on Trust, Security and Privacy in Computing and Communications (pp. 422-431) Authors: Sarah Abughazalah · Kostantinos Markantonakis · Keith Mayes [+details] (Year: 2014).*

(Continued)

*Primary Examiner* — Bruce I Ebersman
*Assistant Examiner* — Hatem M Ali
(74) *Attorney, Agent, or Firm* — Lee & Hayes, P.C.

(57) ABSTRACT

Techniques and arrangements of a point-of-sale (POS) system including a transaction interface control mechanism configured to prevent simultaneous input by a merchant and a customer during a transaction. The POS system can include a merchant user interface (UI) presented on a merchant-facing display and a customer UI presented on a customer-facing display. In some instances, the merchant UI can be on a display of a merchant device, while the customer UI can be on a display of a customer device. In such instances, the merchant device and the customer device can be operably connected via a wired or wireless connection.

20 Claims, 10 Drawing Sheets

US 11,880,818 B2

Page 2

(51) Int. Cl.
    *G06F 3/04842* (2022.01)
    *G06F 3/0481* (2022.01)
    *G07G 1/00* (2006.01)
    *G07G 1/01* (2006.01)

(52) U.S. Cl.
    CPC .......... *G06Q 20/20* (2013.01); *G07G 1/0009* (2013.01); *G07G 1/0036* (2013.01); *G07G 1/01* (2013.01)

(58) Field of Classification Search
    USPC .......................................... 705/39
    See application file for complete search history.

(56) References Cited

U.S. PATENT DOCUMENTS

| | | | |
|---|---|---|---|
| 8,403,211 B2 | 3/2013 | Brooks et al. | |
| 8,448,062 B2 | 5/2013 | Hofmann et al. | |
| 8,630,923 B2 | 1/2014 | Rothman et al. | |
| 9,092,766 B1 | 7/2015 | Bedier et al. | |
| 9,105,026 B1 | 8/2015 | Edwards | |
| 9,568,955 B2 | 2/2017 | Voege et al. | |
| 9,767,446 B2 | 9/2017 | Cooke et al. | |
| 9,838,379 B1* | 12/2017 | Bryan | H04W 12/0431 |
| 9,996,859 B1* | 6/2018 | Koshy | G06Q 30/0276 |
| 10,325,253 B2 | 6/2019 | Artman et al. | |
| 10,504,092 B2 | 12/2019 | Bell et al. | |
| 10,679,469 B2 | 6/2020 | Salmen et al. | |
| 10,783,508 B1 | 9/2020 | Bell et al. | |
| 2002/0010684 A1 | 1/2002 | Moskowitz | |
| 2003/0164398 A1 | 9/2003 | Walker et al. | |
| 2004/0034564 A1 | 2/2004 | Liu | |
| 2008/0016456 A1 | 1/2008 | Friedland et al. | |
| 2009/0012900 A1 | 1/2009 | Morin et al. | |
| 2009/0094126 A1 | 4/2009 | Killian et al. | |
| 2009/0164354 A1 | 6/2009 | Ledbetter et al. | |
| 2009/0259516 A1 | 10/2009 | Zeevi et al. | |
| 2009/0259557 A1 | 10/2009 | Carroll et al. | |
| 2010/0128047 A1 | 5/2010 | Makino et al. | |
| 2010/0128048 A1 | 5/2010 | Makino et al. | |
| 2010/0235249 A1 | 9/2010 | Smith et al. | |
| 2011/0059777 A1 | 3/2011 | Rao | |
| 2012/0078783 A1 | 3/2012 | Park | |
| 2012/0197744 A1 | 8/2012 | Rose et al. | |
| 2012/0290420 A1 | 11/2012 | Close | |
| 2012/0290421 A1 | 11/2012 | Qawami et al. | |
| 2013/0144731 A1 | 6/2013 | Baldwin et al. | |
| 2014/0040139 A1 | 2/2014 | Brudnicki et al. | |
| 2014/0108108 A1 | 4/2014 | Artman et al. | |
| 2014/0249951 A1 | 9/2014 | Gotanda et al. | |
| 2014/0316931 A1 | 10/2014 | Selcuk et al. | |
| 2015/0019356 A1 | 1/2015 | Bagdonas et al. | |
| 2015/0095133 A1* | 4/2015 | Parker | G06Q 30/0238 705/16 |
| 2015/0185768 A1 | 7/2015 | Voege et al. | |
| 2015/0199668 A1 | 7/2015 | Fernando et al. | |
| 2015/0199882 A1 | 7/2015 | Fernando et al. | |
| 2015/0287012 A1 | 10/2015 | Takasu et al. | |
| 2015/0332382 A1 | 11/2015 | Aso et al. | |
| 2015/0338917 A1 | 11/2015 | Steiner et al. | |
| 2015/0339758 A1* | 11/2015 | Moulin | G06Q 30/06 705/14.53 |
| 2015/0363757 A1 | 12/2015 | Mocko et al. | |
| 2016/0063563 A1 | 3/2016 | Abad Fernandez et al. | |
| 2016/0070964 A1 | 3/2016 | Conrad | |
| 2016/0117529 A1 | 4/2016 | Bedier et al. | |
| 2016/0117659 A1 | 4/2016 | Bedier et al. | |
| 2016/0117662 A1 | 4/2016 | Bedier et al. | |
| 2016/0124627 A1* | 5/2016 | Beatty | G06F 1/1694 705/16 |
| 2016/0125449 A1 | 5/2016 | Beatty et al. | |
| 2016/0275470 A1 | 9/2016 | Straw et al. | |
| 2017/0076269 A1 | 3/2017 | Saeed et al. | |
| 2018/0039965 A1* | 2/2018 | Han | G07F 7/1033 |
| 2018/0137491 A1 | 5/2018 | Sanders et al. | |
| 2018/0150817 A1 | 5/2018 | Han et al. | |
| 2019/0102764 A1 | 4/2019 | Pattarawuttiwong | |
| 2020/0342432 A1 | 10/2020 | Bell et al. | |
| 2021/0103911 A1 | 4/2021 | Angrish et al. | |

FOREIGN PATENT DOCUMENTS

| | | | | |
|---|---|---|---|---|
| JP | 2011-070371 A | 4/2003 | | |
| JP | 2004-164195 A | 6/2004 | | |
| JP | 2010-198523 A | 9/2010 | | |
| JP | 2011-013905 A | 1/2011 | | |
| JP | 2016-027449 A | 2/2016 | | |
| WO | WO-2015075892 A1 * | 5/2015 | ............ | G06Q 30/06 |
| WO | 2015/191468 A1 | 12/2015 | | |
| WO | 2016/069775 A1 | 5/2016 | | |
| WO | 2017/222696 A1 | 12/2017 | | |

OTHER PUBLICATIONS

The Implementation of a Full EMV Smartcard for a Point-of-Sale Transaction and Its Impact on the PCI DSS; Published in: 2012 International Conference on Privacy, Security, Risk and Trust and 2012 International Conference on Social Computing (pp. 797-806); Authors: Ogundele, O. · Zavarsky, P. (Year: 2012).*
A Simple and Highly Secure Protocol for POS Terminal; Published in: 2009 Second International Conference on Environmental and Computer Science (pp. 204-207); Authors: Rad, H.A. · Tehrani, M.B. · Samsudin, K. · Ramli, A.R. (Year: 2009).*
Secure Mobile Payment on NFC-Enabled Mobile Phones Formally Analyzed Using CasperFDR; Published in: 2014 IEEE 13th International Conference on Trust, Security and Privacy in Computing and Communications (pp. 422-431) Authors:: Sarah Abughazalah (Year: 2014).*
The Implementation of a Full EMV Smartcard for a Point-of-Sale Transaction and Its Impact on the PCI DSS; Published in: 2012 International Conference on Privacy, Security, Risk and Trust and 2012 International Conference on Social computing (pp. 797-806: Authors: Ogundele, P. et al.(Year: 2012) (Year: 2012).*
1. Secure Mobile Payment on NFC-Enabled Mobile Phones Formally Analyzed Using CasperFDR; Published in: 2014 IEEE 13th International Conference on Trust, Security and Privacy in Computing and Communications (pp. 422-431) Authors:: Sarah Abughazalah (Year: 2014).*
2. A Secure Transaction Scheme With Certificateless Cryptographic Primitives for IoT-Based Mobile Payments. Publisher: IEEE; Authors: Kuo-Hui Yeh (Year:2018)<br> (Year: 2018).*
Advisory Action dated Jul. 17, 2020, for U.S. Appl. No. 15/720,749, of Han, K., et al., filed Sep. 29, 2017.
Non-Final Office Action dated Nov. 10, 2020, for U.S. Appl. No. 15/720,749, of Han, K., et al., filed Sep. 29, 2017.
Non-Final Office Action dated Jan. 27, 2020, for U.S. Appl. No. 15/723,030, of Pattarawuttiwong, S., filed Oct. 2, 2017.
Notice of Allowance dated Apr. 6, 2020, for U.S. Appl. No. 15/142,966, of Bell, B., et al., filed Apr. 29, 2016.
English-language translation of Decision of Refusal for Japanese Patent Application No. 2018-566523, dated Feb. 3, 2020.
"At a Glance Pci Data Storage, Pci Data Storage Do's and Don'ts," PCI Security Standards Council Llc, dated Dec. 31, 2008, Retrieved from the Internet URL: http://web.archive.org/web/20140704155237/https://www.pcisecuritystandards.org/pdfs/pci_fs_data_storage.pdf, on Feb. 8, 2017, pp. 1-2.
Non-Final Office Action dated Mar. 13, 2015, for U.S. Appl. No. 14/572,692, of Bell, B., et al., filed Dec. 16, 2014.
Final Office Action dated Jul. 10, 2015, for U.S. Appl. No. 14/572,692, of Bell, B., et al., filed Dec. 16, 2014.
Non-Final Office Action dated Mar. 11, 2016, for U.S. Appl. No. 14/572,692, of Bell, B., et al., filed Dec. 16, 2014.
Non-Final Office Action dated Oct. 4, 2018, for U.S. Appl. No. 15/188,711, of Bell, B., et al., filed Jun. 21, 2016.
Non-Final Office Action dated Nov. 2, 2018, for U.S. Appl. No. 15/142,966, of Bell, B., et al., filed Apr. 29, 2016.
Non-Final Office Action dated Mar. 19, 2019, for U.S. Appl. No. 15/496,529, of Han, K. filed Apr. 25, 2017.

(56) References Cited

OTHER PUBLICATIONS

Final Office Action dated May 17, 2019, for U.S. Appl. No. 15/142,966, of Bell, B., et al., filed Apr. 29, 2016.
Notice of Allowance dated Jul. 25, 2019, for U.S. Appl. No. 15/188,711, of Bell, B., et al., filed Jun. 21, 2016.
Final Office Action dated Sep. 11, 2019, for U.S. Appl. No. 15/496,529, of Han, K., et al., filed Apr. 25, 2017.
Advisory Action dated Sep. 23, 2019, for U.S. Appl. No. 15/142,966, of Bell, B., et al., filed Apr. 29, 2016.
Non-Final Office Action dated Oct. 18, 2019, for U.S. Appl. No. 15/720,749, of Han, K., et al., filed Sep. 29, 2017.
Notice of Allowance dated Dec. 16, 2019, for U.S. Appl. No. 15/496,529, of Han, K., et al., filed Apr. 25, 2017.
International Search Report and Written Opinion for International Application No. PCT/US2016/068914, dated Feb. 16, 2017.
International Search Report and Written Opinion for International Application No. PCT/US2017/033370, dated Jul. 21, 2017.
Examiner Requisition for Canadian Patent Appication No. 3,027,525, dated Oct. 9, 2019.
Examination report for Australian Patent Application No. 2017281243, dated Nov. 13, 2019.
Final Office Action dated Apr. 15, 2020, for U.S. Appl. No. 15/720,749, of Han, K., et al., filed Sep. 29, 2017.
Corrected Notice of Allowability dated Apr. 29, 2020, for U.S. Appl. No. 15/142,966, of Bell, B., et al., filed Apr. 29, 2016.
Notice of Allowance dated May 13, 2020, for U.S. Appl. No. 15/723,030, of Pattarawuttiwong, S., filed Oct. 2, 2017.
English-language translation of Notice of Decision to Grant for Japanese Patent Application No. 2018-566523, dated Jun. 29, 2020.
English-language translation of Search Report by Registered Search Organization for Japanese Patent Application No. 2018-566523, dated Dec. 24, 2019.
Notice of Acceptance received for Australian Patent Application No. 2017281243, dated Sep. 25, 2020.
Notice of Grant received for Australian Patent Application No. 2017281243, dated Jan. 21, 2021.
Final Office Action dated May 21, 2021, for U.S. Patent Application No. 15/720,749, of Han, K., et al., filed Sep. 29, 2017.
Final Office Action dated Apr. 18, 2022, for U.S. Appl. No. 16/923,512, of Bell, B., et al., filed Jul. 8, 2020.
Non-Final Office Action dated Apr. 20, 2022, for U.S. Appl. No. 15/720,749, of Han, K., et al., filed Sep. 29, 2017.
Non-Final Office Action dated Oct. 4, 2021, for U.S. Appl. No. 15/720,749, of Han, K., et al., filed Sep. 29, 2017.
Advisory Action dated Aug. 18, 2021, for U.S. Appl. No. 15/720,749, of Han, K., et al., filed Sep. 29, 2017.
Non-Final Office Action dated Sep. 2, 2021, for U.S. Appl. No. 16/923,512, of Bell, B., et al., filed Jul. 8, 2020.

* cited by examiner

TRANSACTION INTERFACE CONTROL

RELATED APPLICATIONS

This application claims priority to and is a continuation of U.S. Pat. No. 10,504,092, filed on Jun. 21, 2016, the entire contents of which are incorporated herein by reference.

BACKGROUND

Merchants and customers conduct transactions in commerce on a daily basis in various ways. For instance, a customer can conduct a transaction with a merchant at a point-of-sale system using cash, a transaction card, or other transaction instrument. Many transactions require customer input into the point-of-sale system, such as signing a receipt, approving the transaction, or signing up for a rewards membership to receive a benefit from the merchant.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
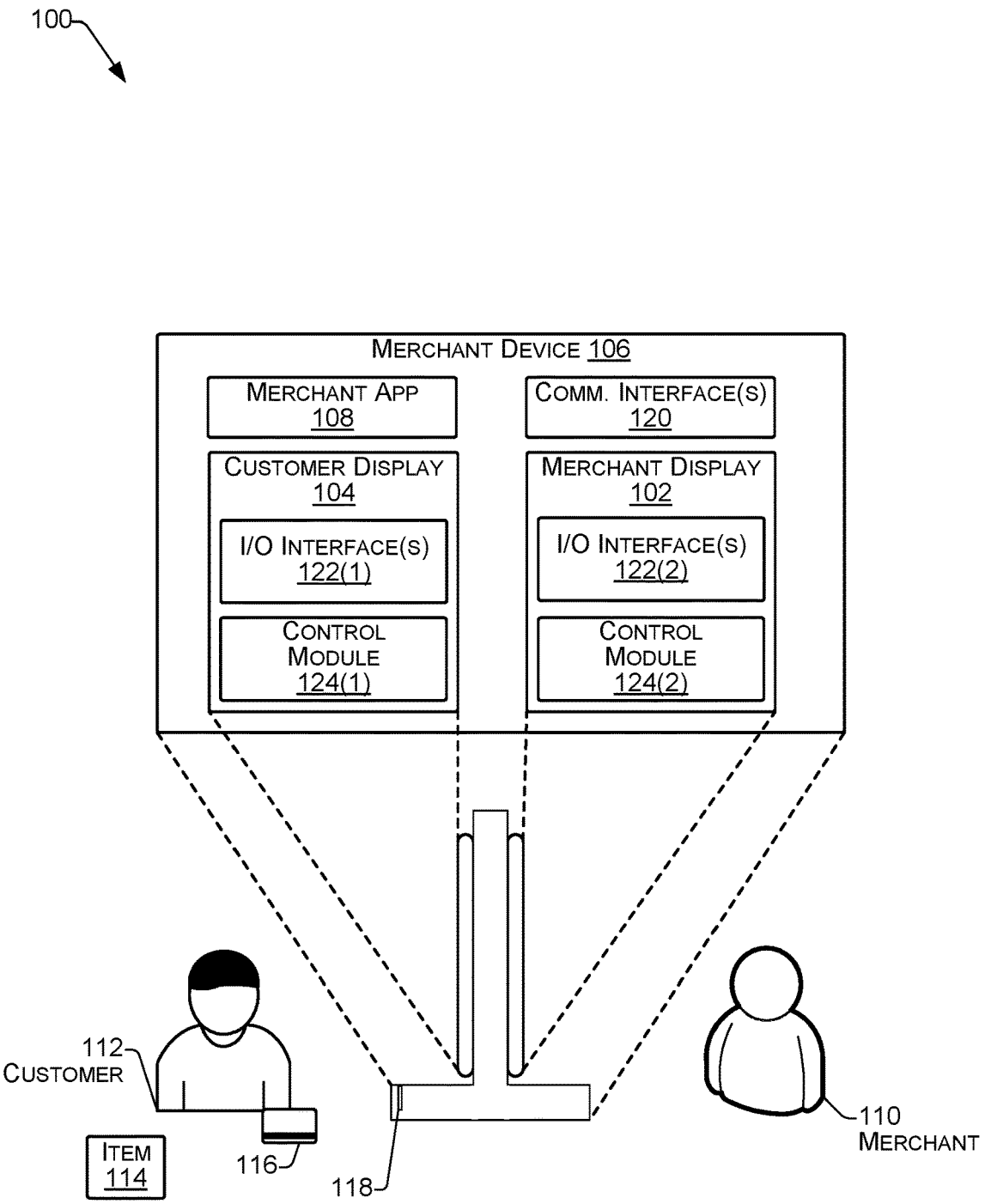
FIG. 1 illustrates an example point-of-sale (POS) system with a merchant display and a customer display configured to participate in a transaction interface control system.

Some implementations described herein include techniques and arrangements of a point-of-sale (POS) system including a transaction interface control mechanism configured to prevent simultaneous input by a merchant and a customer during a transaction. The POS system can include a merchant user interface (UI) presented on a merchant-facing display and a customer UI presented on a customer-facing display. In some instances, the merchant UI can be on a display of a merchant device, while the customer UI can be on a display of a customer device. In such instances, the merchant device and the customer device can be operably connected via a wired or wireless connection.

The transaction interface control mechanism may recognize input via the merchant and/or the customer UI, and may prevent input on the other of the merchant or the customer UI. The transaction interface control mechanism may prevent input by causing the other of the merchant or the customer UI to enter a locked mode. The other of the merchant or the customer UI may remain in the locked mode until the respective device receives an indication of input completion from the other device.

In some instances, the locked mode may substantially preclude input via the UI, allowing select inputs via the UI (e.g., an override of the locked mode, an alternate UI selection, etc.). For example, the merchant UI can include a locked mode override selection available while operating in the locked mode. In such examples, the locked mode may prevent other input, but may provide a means by which the merchant UI can exit the locked mode. In such instances, the merchant UI may maintain ultimate control of the POS system.

For another example, the merchant device may include an alternate merchant UI selection while the merchant UI is operating in the locked mode. The alternate merchant UI may provide a means by which the POS system may process a concurrent transaction with a second customer. The merchant may minimize (e.g., set aside on the merchant display) the first UI operating in the locked mode, and may process a transaction in the second UI.

The transaction interface control mechanism of the POS system can have the technical advantage of optimizing a transaction between a customer and a merchant. Because the transaction interface control mechanism can prevent simultaneous input by the merchant and the customer, the transaction information can be input more efficiently, thereby decreasing an overall time required for a particular transaction. As such, a merchant may be able to process more transactions in a fixed amount of time. Additionally, the POS system described herein may provide for a second merchant UI which can allow a merchant to conduct simultaneous transactions with two or more customers. Thus, the merchant could potentially process an even greater number of transactions in a fixed amount of time.

Furthermore, the transaction interface control mechanism of the POS system described herein can improve the functioning of the computer itself by preventing delays caused by simultaneous input by a merchant and a customer. Simultaneous input by a merchant and a customer can cause a delay in a POS system, as the system may not know what data to process first, or which party should have priority in a given situation. However, because the transaction interface control mechanism can recognize input into one UI and automatically cause the other UI to enter a locked mode, the POS system described herein can avoid information input into a customer UI and a merchant UI simultaneously, thereby improving the functioning of the computer itself As used herein, unless otherwise noted, the term "merchant UI" refers to the user interface on a merchant display of a POS system. The term "customer UI" refers to the user interface on a customer display of a POS system, or on a customer device configured to conduct a transaction with a merchant device.

For discussion purposes, example implementations, such as a POS system used in conducting a transaction, are described below with reference to the corresponding figures. However, implementations herein are not limited to the POS system. The techniques discussed herein may be extended to other environments, other system architectures, other types of applications, and so forth, as will be apparent to those of skill in the art in light of the disclosure herein.

FIG. 1 illustrates an example point-of-sale (POS) system 100 with a merchant display 102 (e.g., a merchant terminal) and a customer display 104 (e.g., a customer terminal) configured to participate in a transaction interface control system. In various examples, the merchant display 102 and the customer display 104 can be components of respective merchant and customer devices. In the illustrative example, the merchant display 102 and the customer display 104 are components of a merchant device 106.

The merchant device 106 can include any sort of mobile or non-mobile device that includes an instance of a merchant application 108 to enable POS transactions between a merchant 110 and a customer 112. The merchant application 108 may provide POS functionality to the merchant device 106 to enable the merchant 110 (e.g., an owner, employee, individual user, etc.) to accept payments from customers. In some types of businesses, the merchant device 106 may correspond to a store or other place of business of the merchant 110, and thus, may be a fixed location that typically does not change on a day-to-day basis. In other types of businesses, however, the merchant device 106 may change from time to time, such as in the case that the merchant 110 operates a food truck, is a street vendor, a cab driver, etc., or has an otherwise mobile business, e.g., in the case of merchants who sell items at buyer's homes, places of business, and so forth.

As used herein, a merchant 110 may include any business engaged in the offering of goods or services for acquisition by customers. Actions attributed to a merchant 110 may include actions performed by owners, employees, or other agents of the merchant 110 and thus no distinction is made herein unless specifically discussed. In addition, as used herein, a customer 112 may include any entity that acquires goods and/or services from a merchant 110, such as by purchasing, renting, leasing, borrowing, licensing, or the like. Hereinafter, goods and/or services offered by merchants 110 may be referred to as items. Thus, a merchant 110 and a customer 112 may interact with each other to conduct a transaction in which the customer acquires an item 114 from a merchant 110, and in return, the customer 112 provides payment to the merchant 110. The customer 112 may provide payment to the merchant 110 via cash, a payment instrument 116, or other method of transferring funds from one party to another.

The merchant device 106 can be communicatively coupled to a payment object reader 118. The payment object reader 118 can read data from a magnetic stripe card, an EMV chip-type card, or an NFC enabled payment instrument 116, and can communicate the data to the merchant device 106. In various examples, the payment object reader 118 can be integral and/or coupled to the merchant device 106 via a direct connection. In some examples, the payment object reader 118 can be communicatively coupled to the merchant device through a wireless connection, such as WiFi, Bluetooth, BLE (Bluetooth low energy), NFC, or other appropriate short-range communication.

To facilitate communication between the merchant device 106, a payment instrument 114, a payment object reader 118, and/or a customer device, the merchant device 106 can include one or more communication interface(s) 120. The one or more communication interface(s) 120 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet, and the like. Communication interfaces 120 can also provide communication with external storage (not shown), such as in a storage array, network attached storage, storage area network, or the like.

The one or more communication interface(s) 120 of the merchant device 106 can also facilitate communications between the merchant device 106 and a payment processing system. As discussed above, the payment object reader 118 can receive payment instrument 116 information (e.g., a bank, a credit card company, an account number, etc.) from reading data from the payment instrument, and send the data to the merchant device 106. In various examples, the payment object reader 118 can receive encrypted data from the payment instrument 116 and/or can encrypt the payment information received from the payment instrument 116. In such examples, the payment object reader 118 can provide the encrypted payment instrument information to the merchant application 108 on the merchant device 106.

In various examples, the merchant application 108 can receive the payment instrument information, and transmit the information along with transaction data (e.g., payment instrument data, total amount, time, location, and other data related to the transaction) to a payment processing system. The payment processing system can be a payment service in which merchants 110 are able to conduct electronic POS transactions with customers. The payment processing service can include one or more servers configured to process secure electronic financial transactions (e.g., payment during a transaction) by communicating with the merchant device 106, card payment networks, and/or banks or other financial institutions payment systems. In various examples, the payment instrument information can be encrypted. In such examples, the merchant device 106 and/or the merchant application 108 may provide a conduit through which payment for goods and/or services is processed. As such, customer payment information may be hidden from view of the merchant.

The merchant application 108 may be configured to process input received via one or more input/output (I/O) interface(s) 122. The I/O interfaces 122 can include peripheral input devices, such as a keyboard, a mouse, a pen, a game controller, a voice input device, a touch input device, a gestural input device, or any other device capable of receiving input. The input may include input events, e.g., a user of the merchant device 106 touching or simulating a touch by placing a finger in proximity to a presence-sensitive display, or by using a keyboard or other input mechanism. In various examples, the input may comprise a series of input events related to processing transactions via the merchant application 108, such as processing payment for goods and/or services.

In the illustrative example, the merchant device 106 can include an I/O interface 122(1) on a customer display 104 and an I/O interface 122(2) on a merchant display 102. In such examples, the merchant application 108 can receive input from the customer 112 via I/O interface 122(1), and from the merchant via I/O interface 122(2).

In various examples, the merchant device 106 can include one or more control modules 124 configured to prevent simultaneous input via the I/O interfaces 122(1) and 122(2). A control module 124(1) or 124(2) can receive an indication from the respective I/O interface 122(1) or 122(2), and can send a signal to the other control module 124(1) or 124(2). The signal can include an instruction to lock the user interface on the respective display. For example, if a customer begins to input data via the I/O interface 122(1) on the customer display 104, the control module 124(1) can send a message to control module 124(2) indicating the input. The control module 124(2) can receive the message, and automatically engage a locked mode on the merchant display, thereby preventing and/or substantially preventing input by the merchant 110 via the I/O interface 122(2).

In various examples, the control module 124(1) can identify that a customer is entering sensitive information (e.g., personally identifiable information) into the I/O interface 122(1). For example, a customer UI can request customer financial information when the customer sets up a user profile. Based on the identification of the input of sensitive information, the control module 124(1) can send a message to the control module 124(2) indicating the input. In response to the message, the control module 124(2) can engage a locked mode of the merchant display 102.

In various examples, the merchant display 102 can present the information input by the customer 112. In such examples, the merchant 110 can track progress and/or answer questions the customer 112 may have while entering the data. In some examples, such as when sensitive information is input by the customer, the control module 124(2) can cause at least some of the information to be redacted from the merchant display 102.

In some examples, the merchant control module 124(2) can include an override of the locked mode. In such examples, the merchant 110 can select an override option, and can exit the locked mode. In various examples, the I/O interface 122(2) of the merchant display can minimize and/or otherwise shrink the locked user interface, and can allow the merchant to input transaction data for a second POS transaction with the same or a different customer.

Figure 2:
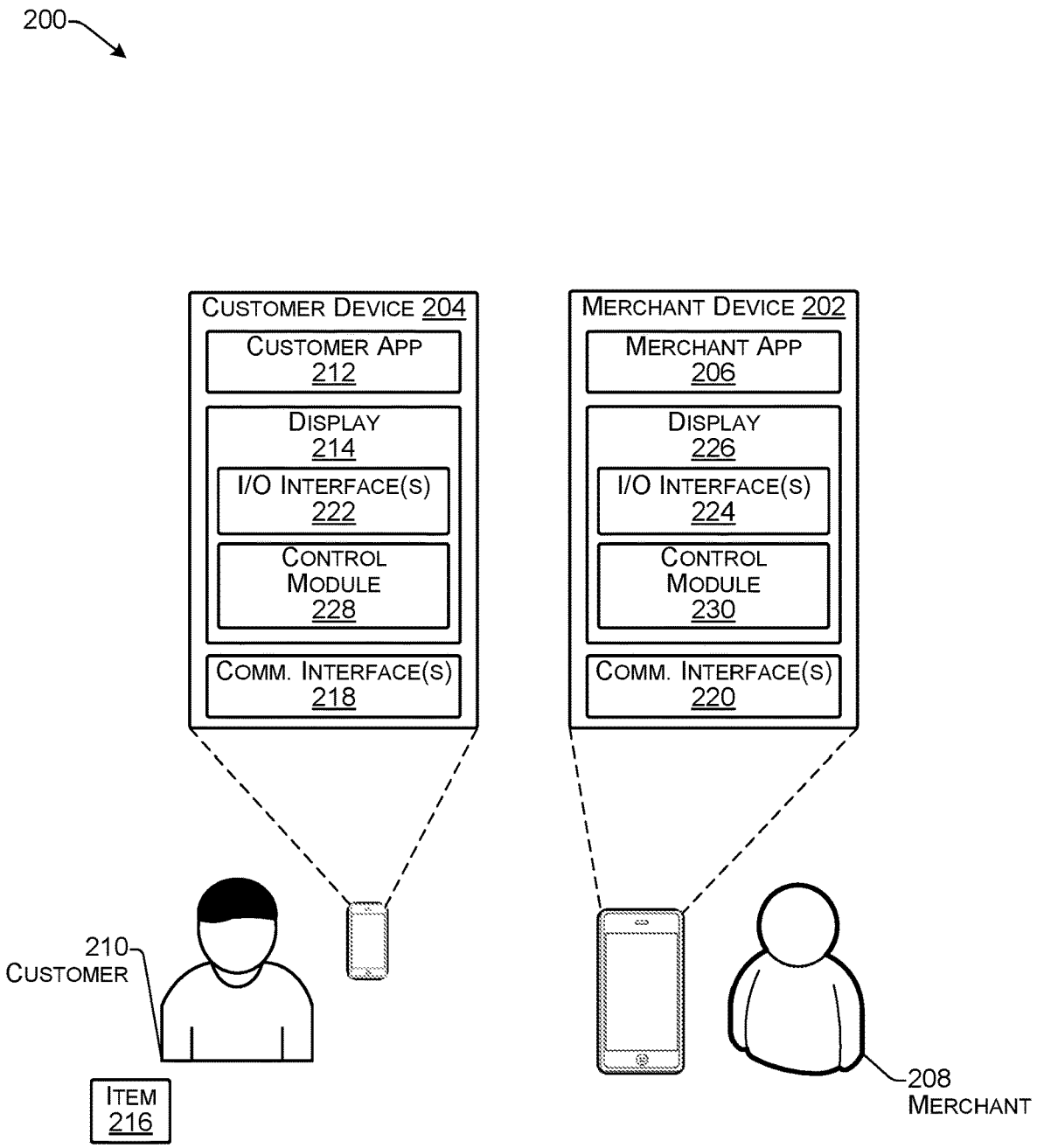
FIG. 2 illustrates an example environment that includes a point-of-sale (POS) system with a merchant device and a customer device configured to participate in a transaction interface control system.

FIG. 2 illustrates an example environment 200 that includes a point-of-sale (POS) system with a merchant device 202 and a customer device 204 configured to communicate for transaction processing. The merchant device 202, such as merchant device 106 can include any sort of mobile or non-mobile device that includes an instance of a merchant application 206 to enable POS transactions between a merchant 208 and a customer 210. The merchant application 206 may provide POS functionality to the merchant device 202 to enable the merchant 208 (e.g., an owner, employee, individual user, etc.) to accept payments from customers.

The customer device 204 can include any sort of mobile or non-mobile device that includes an instance of a customer application 212. The customer application 212 can provide a means by which a customer 210 can conduct a POS transaction with the merchant 208, such as via communication with a merchant application 206. In various examples, the customer application 212 can send payment information to the merchant application 206 for processing payment for one or more items 216.

In various examples, the customer application 212 can include an instance of a banking application, or other application configured to assist in transferring payment for the one or more items 216. In some examples, the customer application 212 can include an instance of the merchant application 206 for customer input. For example, the customer device 204 can be connected to the merchant device via a communication channel (e.g., WiFi, Bluetooth, a wired connection, etc.). The customer application 212 can cause a customer UI associated with the merchant application 206 to present on a display 214 of the customer device 204. In some examples, the customer UI can be a generic transaction UI configured to communicate with the merchant application 206.

To facilitate communication via the communication channel, the customer device 204 and the merchant device 202 can include communication interfaces 218 and 220, respectively. Similar to communication interface(s) 120 of FIG. 1, the communication interfaces 218 and 220 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet, and the like.

In various examples, the communication interfaces 218 and 220 can send messages between the customer device 204 and the merchant device 202, based on input into the respective devices. The input can be via an I/O interface 222 on the customer device 204 and/or an I/O interface 224 on the merchant device 202. The I/O interfaces 222 and 224 can include peripheral input devices, such as a keyboard, a mouse, a pen, a game controller, a voice input device, a touch input device, a gestural input device, or any other device capable of receiving input. The input may include input events, e.g., a merchant touching or simulating a touch by placing a finger in proximity to a display 226 (e.g., a presence-sensitive display), or by using a keyboard or other input mechanism. In various examples, the input may comprise a series of input events related to processing transactions via the merchant application 206, such as processing payment for goods and/or services.

In various examples, the customer device 204 and the merchant device 202 can include control modules 228 and 230, respectively. In such examples, the control modules 228 and 230 can be configured to prevent simultaneous input via the I/O interfaces 222 and 224, respectively.

The control module 228 or 230 can receive an indication from the respective I/O interface 222 or 224, and can send a signal to the other control module 228 or 230. The signal can include an instruction to lock the user interface on the respective display. For example, if a customer begins to input data via the I/O interface 222 on the customer device 204, the control module 228 can send a message to control module 230 on the merchant device 202, indicating the input. The control module 230 can receive the message, and automatically engage a locked mode on the display 226 of the merchant device 202, thereby preventing and/or substantially preventing input by the merchant 208 via the I/O interface 224.

In various examples, the control module 228 or 230 can send the signal to the other control module 228 or 230 based on the type of input received via the respective I/O interface 222 or 224. In such examples, the signal can be sent based on input of payment information, personally identifiable information, or other sensitive information.

In some examples, the respective displays 214 and 226 of the customer device 204 and the merchant device 202 can present information input by the other party when operating in the locked mode. In such examples, each of the customer 210 and the merchant 208 can track progress and/or answer questions the other party may have while entering the data. In some examples, such as when a party is entering sensitive information, the respective control modules 228 and 230 can cause at least some of the information to be redacted.

In various examples, the merchant control module 230 can include an override of the locked mode. In such examples, the merchant 208 can select an override option, and can exit the locked mode.

Additionally, the I/O interface 224 on the merchant device 202 can include an option to minimize and/or otherwise shrink the locked user interface, and can allow the merchant 208 to input transaction data for a second POS transaction with the same or a different customer.

Figure 3:
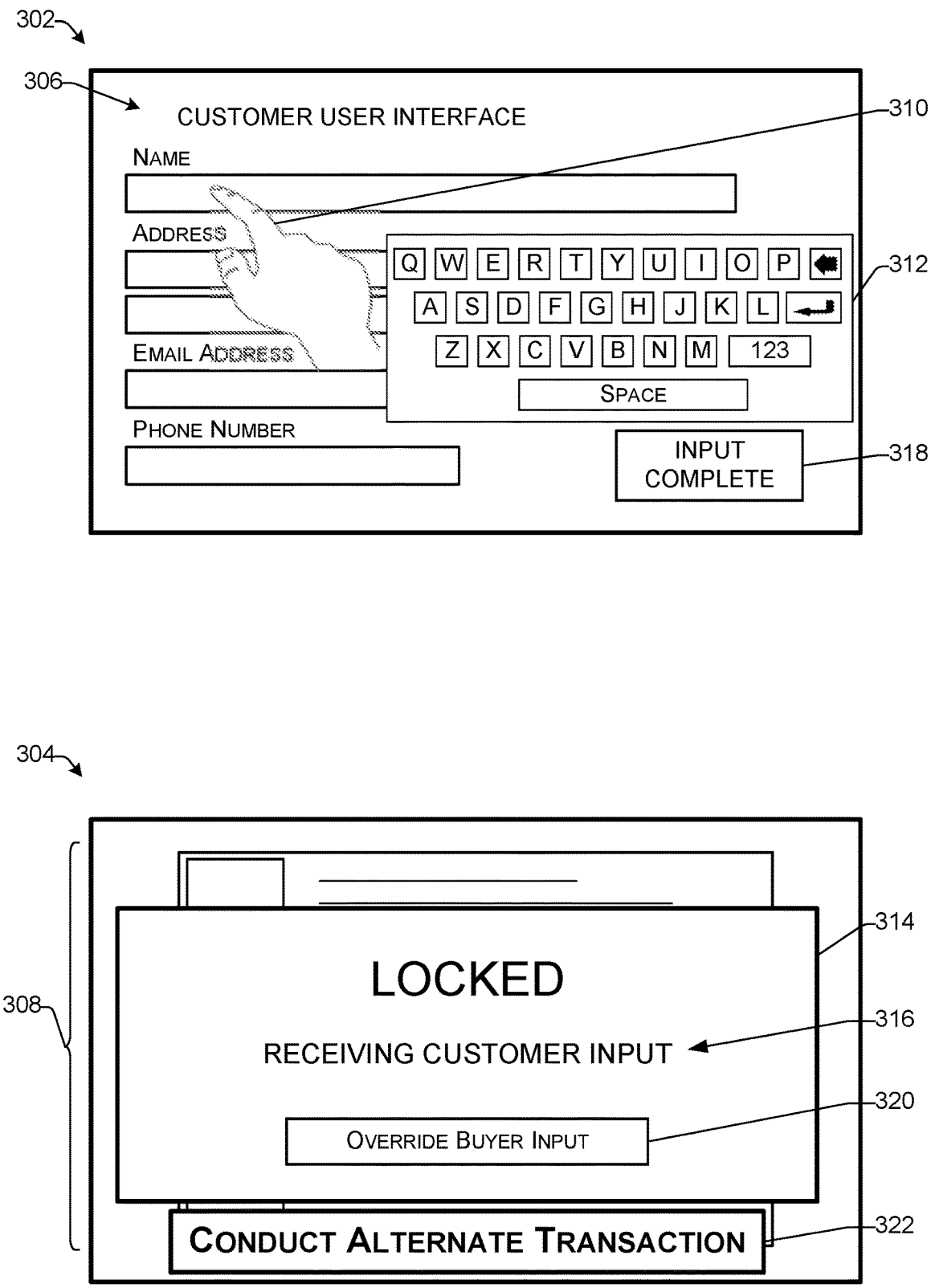
FIG. 3 illustrates an example customer display receiving input and an example merchant display operating in a locked mode responsive to the input.

FIG. 3 illustrates an example customer display 302 of a POS system receiving input and an example merchant display 304 of the POS system operating in a locked mode responsive to the input. In various examples, the customer display 302 can be a display of a customer device, such as customer device 204, and the merchant display 304 can be a display of a merchant device, such as merchant device 202. In such examples, the customer device and the merchant device may be configured to operate together as a POS system to conduct a POS transaction. In some examples, the POS system can include a merchant device, such as merchant device 106, including a customer display 302 and a merchant display 304.

The customer display 302 can include a customer interface 306 and the merchant display 304 can include a merchant interface 308. Each of the customer interface 306 and the merchant interface 308 can be configured to accept inputs from the respective user. In the illustrative example, the customer interface 306 and the merchant interface 308 can include a touch screen I/O interface. The touch screen I/O interface can include a keyboard 312, or other touch screen mechanism to facilitate data entry. In some examples, the customer interface 306 and/or the merchant interface 308 can receive input via one or more other input devices, such as an external keyboard, a mouse, or other input devices.

As illustrated in FIG. 3, the customer interface 306 can be configured to receive input from the customer 310. The input from the customer 310 can be registered by a control module associated with the customer display, such as control module 124(1). The control module can be configured to prevent simultaneous input into the customer user interface 306 and a merchant interface 308. The control module associated with the customer display 302 can receive an indication of the input from the customer 310, and can send a signal of input to a control module associated with the merchant display 304. The signal of input can include an instruction for the merchant interface 308 to enter a locked mode. The locked mode can prevent and/or substantially prevent merchant input via the merchant interface 308. In various examples, the merchant interface 308 can enter the locked mode automatically upon receipt of the signal of input. In such examples, the control module associated with the customer display 302 can cause the merchant interface 308 to enter the locked mode. In some examples, the control module associated with the merchant display 304 can receive the signal of input, and can provide a means by which the merchant can select the locked mode, such as an inquiry of "enter locked mode?," "yes" or "no." Responsive to a merchant input of "yes," the merchant interface 308 can enter the locked mode.

In various examples, the merchant interface 308 can display a locked mode notification 314. In some examples, the locked mode notification 314 can include an alert 316 notifying the merchant of the reason for entering the locked mode, such as "receiving customer input." In some examples, the locked mode notification 314 can include a visual depiction of at least some of the information entered via the customer interface 306. In such examples, the merchant may be able to track progress of the customer's input. In examples including a visual depiction of the customer interface 306, the control module associated with the customer display 302 and/or the control module associated with the merchant display 304, may redact sensitive information (e.g., personally identifiable information) entered by the customer. For example, a merchant rewards program application may include customer financial information used to classify the customer in a particular shopping category. The financial information, however, may be used only by the merchant reward program, and may be redacted from view of the merchant.

In various examples, the control module associated with the merchant display 304 can receive an indication of input completion from the control module associated with the customer display 302. In such examples, the customer can indicate input completion via an input completion button 318. Responsive to the input via the input completion button 318, the control module associated with the customer display 302 can send a signal to the control module associated with the merchant display 304 indicating that the customer is complete with the input. In some examples, the control module associated with the merchant display 304 can disengage the locked mode responsive to receipt of the completion signal. In various examples, the control module associated with the merchant display 304 can disengage the locked mode automatically after a pre-determined period of time, to prevent prolonged locked periods. For example, the control module associated with the merchant display 304 may disengage the locked mode on the merchant interface 308 after being locked for one minute. For another example, the locked mode of the merchant interface 308 may be unlocked after two minutes of operating in the locked mode.

In various examples, the control module associated with the merchant display 304 can include a locked mode override. In such examples, the locked mode override can include an override selection 320 (illustrated as "Override Buyer Input") for the merchant to override the buyer input and take control of the POS transaction. Responsive to input via the override selection 320, the control module associated with the merchant display 304 can establish input priority into a merchant application. In some examples, responsive to input via the override selection 320, the control module associated with the customer display 302 can cause the customer display 302 to enter a locked mode, thereby preventing and/or substantially preventing input via the customer interface 306.

Additionally or alternatively, the control module associated with the merchant display 304 can include a second merchant UI to provide a means by which the POS system may process a concurrent transaction with a second customer. As will be described in more detail in FIG. 5 below, the merchant display 304 can include an alternate transaction selection 322. The alternate transaction selection 322 can be independent of the locked mode, and thus can be selected while the merchant interface 308 is operating in the locked mode. In various examples, responsive to selection of the alternate transaction selection 322, the locked merchant interface can be minimized and/or otherwise made smaller on the merchant display 304. Additionally, responsive to the selection of the alternate transaction selection 322, a second merchant interface can be presented on the merchant display 304. The second merchant interface can provide a means by which the merchant can conduct a second transaction with a second customer, while the POS system is receiving input from the customer 308.

Figure 4:
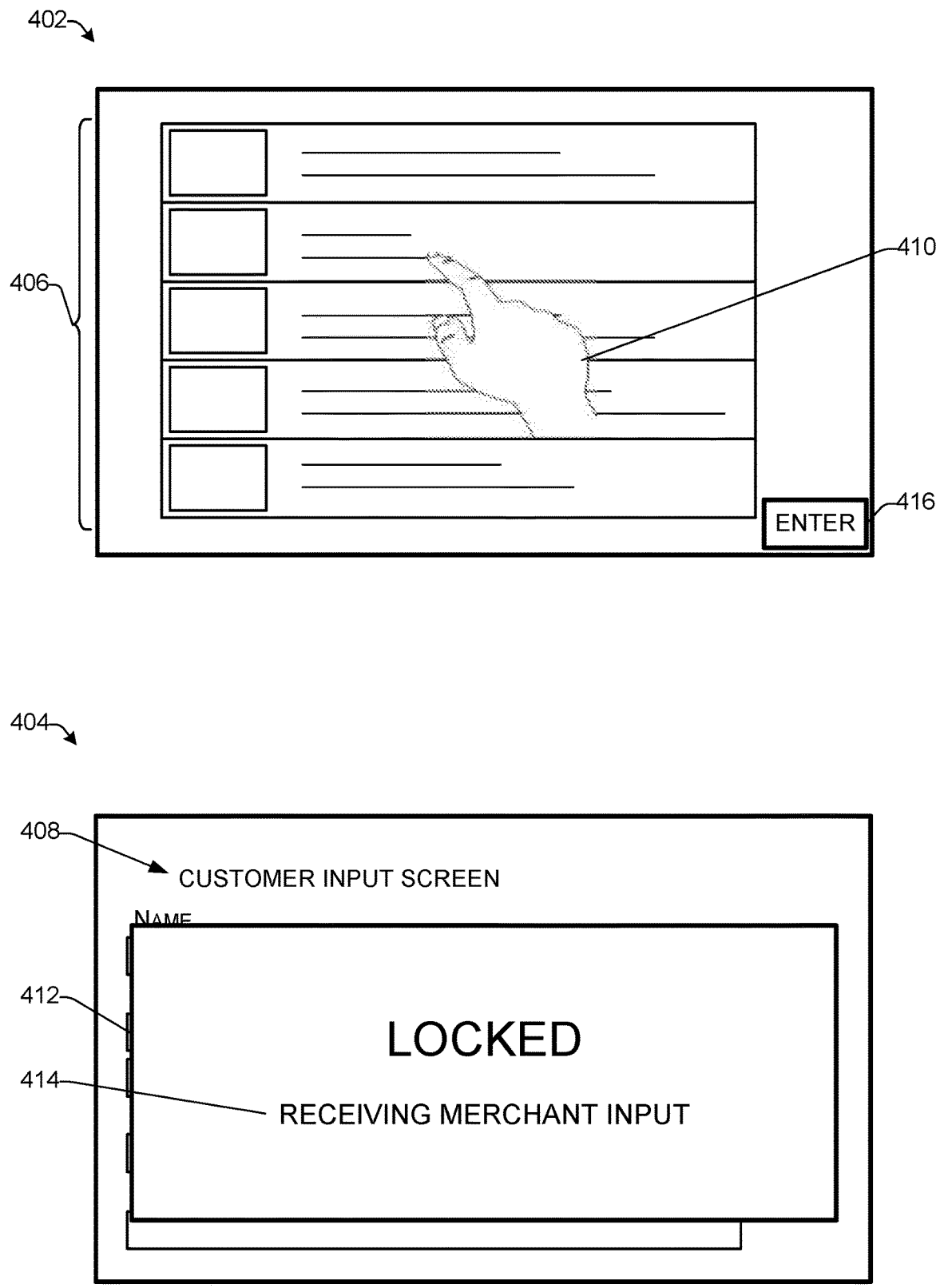
FIG. 4 illustrates an example merchant display receiving input and an example customer display operating in a locked mode responsive to the input.

FIG. 4 illustrates an example merchant display 402 receiving input and an example customer display 404 operating in a locked mode responsive to the input. As discussed above with respect to FIGS. 1-3, the merchant display 402 and the customer display 404 can be displays on a merchant device of a POS system, or displays on respective customer and merchant devices configured to operate together in a POS system.

The merchant display 402 and the customer display 404 can include respective user interfaces. The merchant interface 406 can include transaction data (e.g., items purchased, cost, tax, gratuity, discounts, etc.), payment method data (e.g., credit card, debit card, cash, electronic fund transfer, etc.), merchant reward information, and any other information pertinent to the transaction. The customer interface 408 can include customer information (e.g., payment method, signature, customer personal data, and the like) related to the transaction.

In the illustrative example, the merchant interface 406 and the customer interface 408 include touch screen I/O interfaces. In other examples, the respective interfaces 406 and 408 can receive input via one or more other input devices, such as an external keyboard, a mouse, or other input devices.

The input from the merchant 410 can be registered by a control module associated with the merchant display 402, such as control module 124(2). The control module can be configured to prevent simultaneous input into the merchant interface 406 and the customer interface 408. The control module associated with the merchant display 402 can receive an indication of the input from the merchant 410, and can send a signal of input to a control module associated with the customer display 404. The signal of input can include an instruction for the customer display 404 to enter a locked mode. The locked mode on the customer display 404 can prevent customer input via the customer interface 408. In various examples, the customer interface 408 and/or the customer display 402 can enter the locked mode automatically upon receipt of the signal of input.

In various examples, the customer interface 408 can display a locked mode notification 412. In some examples, the locked mode notification 412 can include an alert 414 notifying the customer of the reason for entering the locked mode, such as "receiving merchant input." In some examples, the locked mode notification 412 can include a visual depiction of at least some of the information entered via the merchant interface 406. In such examples, the customer may be able to track the merchant's input, such as item entry during the transaction.

In various examples, the control module associated with the customer display 404 can receive an indication of input completion from the control module associated with the merchant display 402. In such examples, the merchant can indicate input completion via an input completion button 416. Responsive to the input via the input completion button 416, the control module associated with the merchant display 402 can send a signal to the control module associated with the customer display 404 indicating that the merchant input is complete. In some examples, responsive to receiving the indication of merchant input completion, the control module associated with the customer device 404 can automatically disengage the locked mode.

Figure 5:
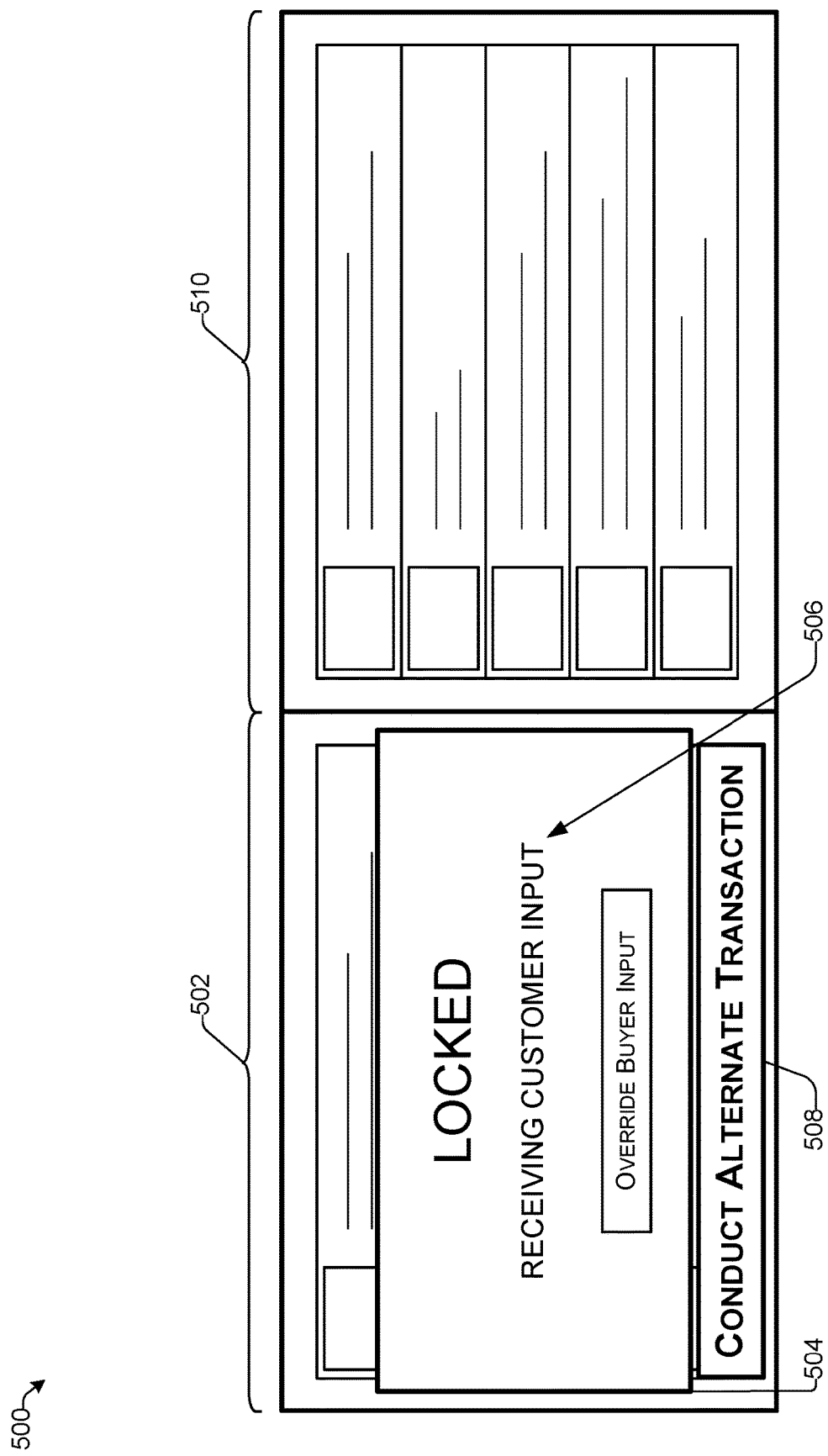
FIG. 5 illustrates an example merchant display of a point-of-sale system configured to conduct concurrent transactions.

FIG. 5 illustrates an example merchant display 500 of a POS system configured to conduct concurrent transactions. A first merchant interface 502 can receive a signal indicating customer input via a customer interface on a customer display of the POS system. In various examples, the signal can include an instruction for the first merchant interface 502 to enter a locked mode. In various examples, responsive to receipt of the signal, a control module associated with the merchant display 500 can cause the first merchant interface 502 to enter the locked mode. The locked mode can prevent and/or substantially prevent input into the first merchant interface 502.

In various examples, the first merchant interface 502 can display a locked mode notification 504. In some examples, the locked mode notification 504 can include an alert 506 notifying the merchant of the reason for entering the locked mode, such as "receiving customer input." In some examples, the locked mode notification 504 can include a visual depiction of at least some of the information entered via the customer user interface. In such examples, the merchant may be able to track progress of the customer's input. In examples including a visual depiction of the customer user interface, the control module associated with the customer display and/or the control module associated with the merchant display 500, may redact sensitive information (e.g., personally identifiable information) entered by the customer. For example, a merchant rewards program application may include customer financial information used to classify the customer in a particular shopping category. The financial information, however, may be used only by the merchant reward program, and may be redacted from view of the merchant. For another example, payment information input by customer, such as a payment instrument number, signature and/or pin number, may be redacted from view by the merchant.

In various examples, the first merchant interface 502 can include an alternate transaction selection 508. The alternate transaction selection 508 can be independent of the locked mode, and thus can be selected while the first merchant interface 502 is operating in the locked mode. In various examples, responsive to selection of the alternate transaction selection 508, the first merchant interface can be minimized and/or otherwise made smaller on the merchant display 500. In the illustrative example, the first merchant interface 502 is minimized to a size equivalent to approximately half the merchant display 500. In other examples, the first merchant interface 502 can be presented in a larger or smaller portion of the merchant display 500.

Additionally, responsive to the selection of the alternate transaction selection 508, a second merchant interface 510 can be presented on the merchant display 500. The second merchant interface 510 can provide a means by which the merchant can conduct a second transaction with a second customer, while the first merchant interface locked (e.g., the POS system is receiving input from the customer). The second merchant interface 510 can receive transaction data (e.g., goods sold, services rendered, amount, tax, gratuity, time, location, and other data related to the transaction) related to the second transaction.

In various examples, the second merchant interface 510 can conduct cash POS transactions with the second customer. In some examples, the second merchant interface 510 can conduct electronic fund transfer or other payment method POS transactions with the second customer. The second merchant interface 510 can route the transaction data and payment information to the merchant application for processing of the second transaction. In some examples, the processing of the second transaction can be through a payment processing service. The merchant may continue to conduct concurrent transactions with customers while the first merchant interface is locked. In various examples, the first merchant interface 502 and/or the second merchant interface 510 may receive a notification, such as via a control module, that the first customer is complete with the input via the customer interface. In such examples, the merchant may re-engage the first transaction via the first merchant interface 502.

Figure 6:
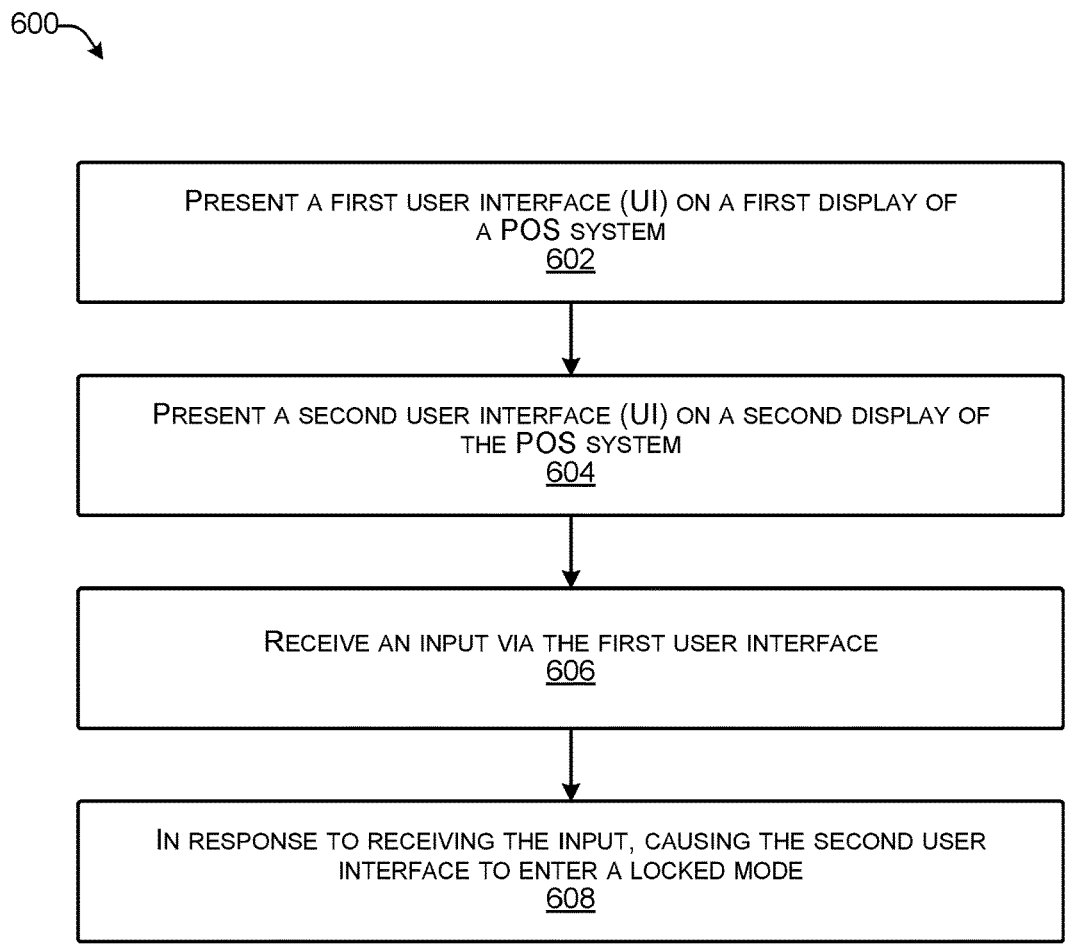
FIG. 6 illustrates a flow diagram of an example process for controlling input on a merchant display of a point-of-sale (POS) system.
Figure 7:
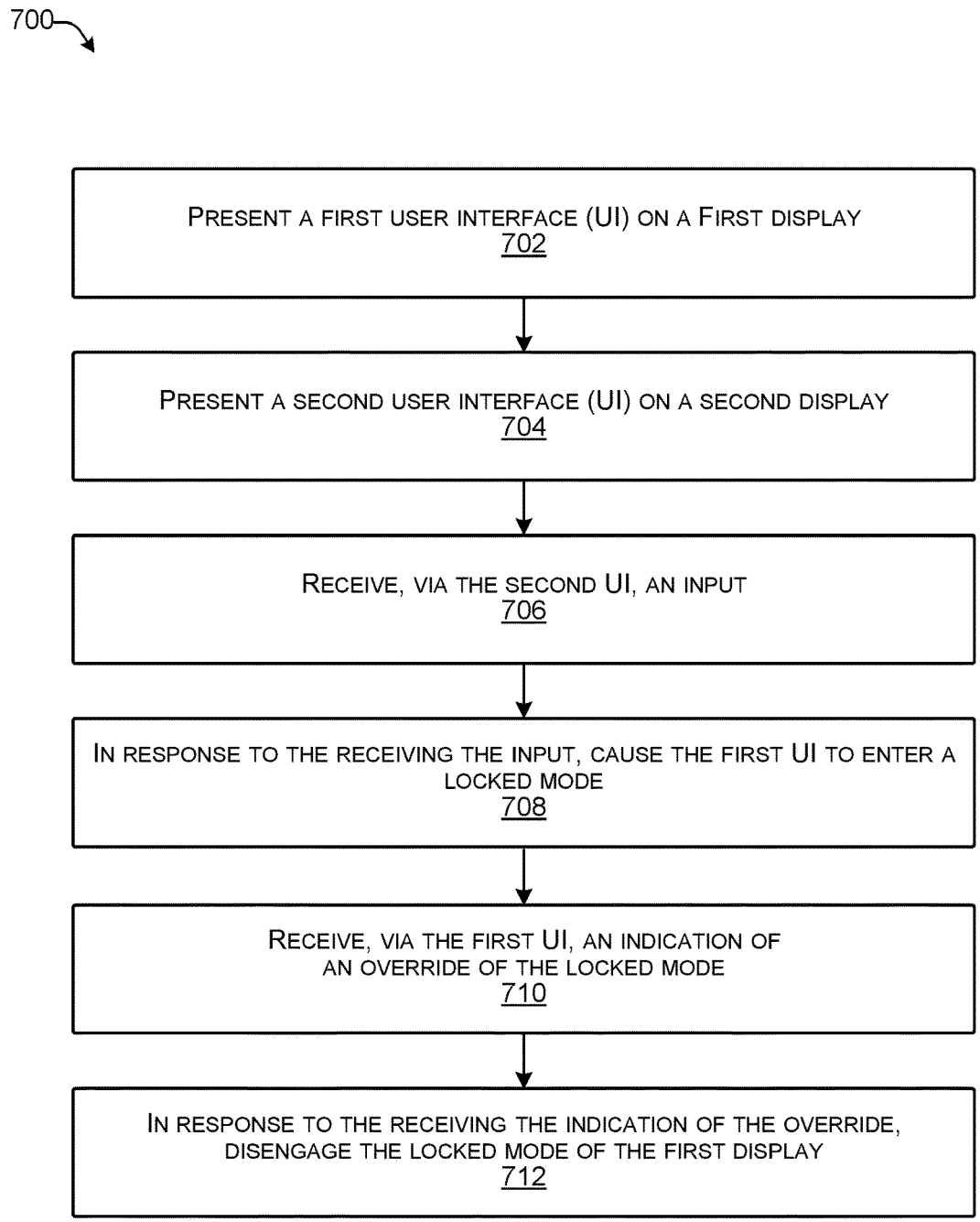
FIG. 7 illustrates a flow diagram of an example process for overriding a locked mode on a merchant display of a point-of-sale (POS) system.
Figure 8:
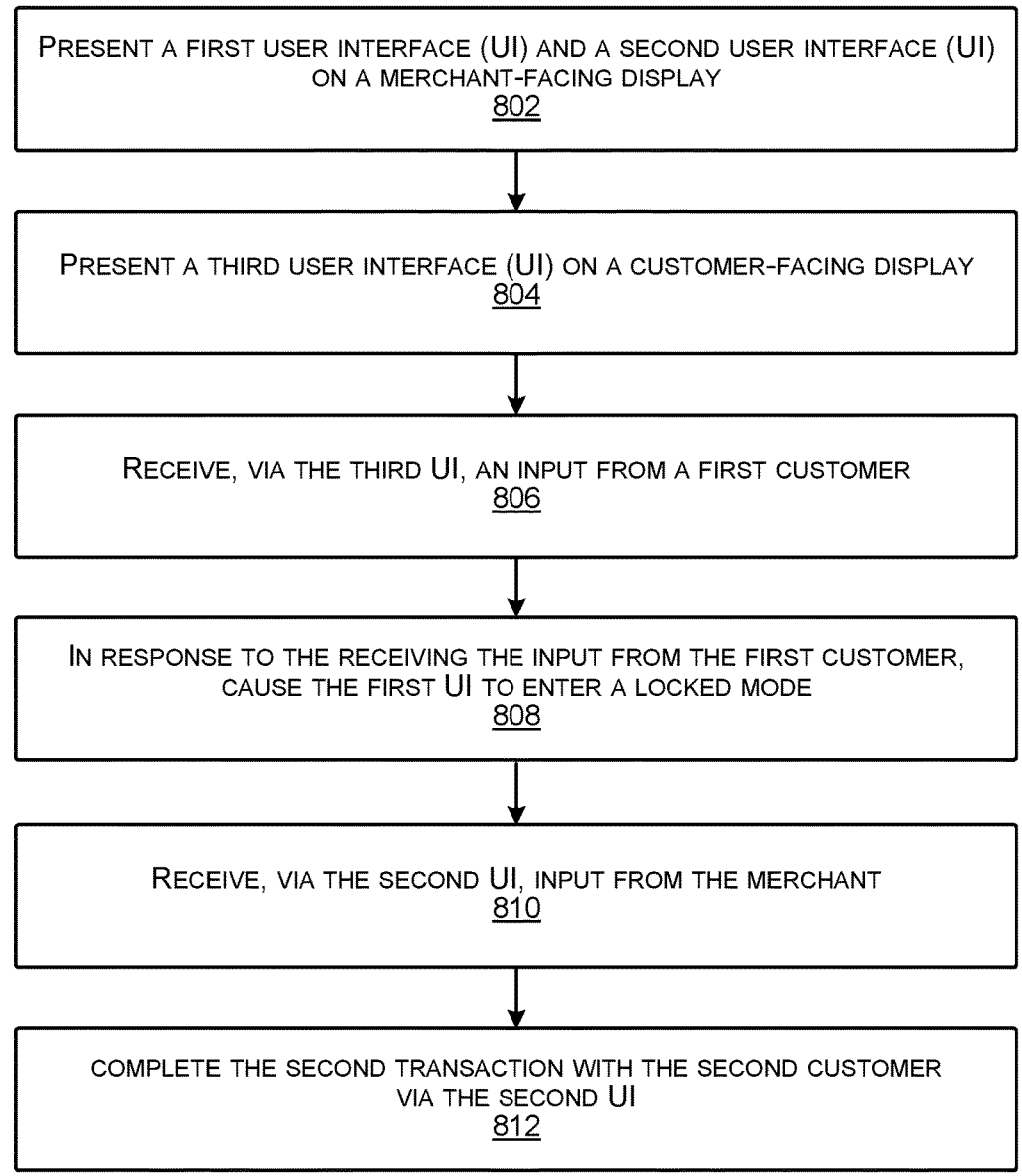
FIG. 8 illustrates a flow diagram of an example process for a point-of-sale (POS) system to conduct concurrent transactions when a first user interface is in a locked mode.

FIGS. 6-8 illustrate flow diagrams of processes for controlling input via a user interface of a POS system. Processes 600, 700, and 800 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

FIG. 6 illustrates a flow diagram of a process 600 for controlling input on a merchant display of a point-of-sale (POS) system. At 602, the POS system can present a first user interface (UI) on a first display. In various examples, the first UI can include a merchant UI configured to receive input from the merchant. The input from the merchant can include transaction data (e.g., items purchased, cost, tax, gratuity, discounts, etc.), payment method data (e.g., credit card, debit card, cash, electronic fund transfer, etc.), merchant reward information, and any other information pertinent to the transaction. In other examples, the first UI can include a customer UI configured to receive input from the customer. The input from the customer can include a payment method, signature, customer personal data, and other pertinent customer information related to the transaction.

At 604, the POS system can present a second UI on a second display. The second UI can include a UI configured to receive input from the merchant or the customer, the party from which the first UI is not configured to receive.

In various examples, the POS system can present the second UI on a second display associated with a separate device. In some examples, the separate device can be a customer device configured to communication with the merchant device in a POS system, in order to conduct a transaction. In other examples, the separate device can include a second merchant device configured to communicate with a first merchant device to process POS transactions.

At 606, the POS system can receive an input via the first user interface. The input can include input events, e.g., a user of the merchant device touching or simulating a touch by placing a finger in proximity to a presence-sensitive display, or by using a keyboard or other input mechanism. In various examples, the input can include a series of input events related to processing transactions via merchant application, such as processing payment for goods and/or services. In some examples, the input can include a series of input events related to entering customer data, such as during an establishment of a customer profile in a merchant reward program. In such examples, the customer data can be input by a merchant via a merchant interface and/or a customer via a customer interface.

At 608, in response to receiving the input, the POS system can cause the second user interface to enter a locked mode. In various examples, a control module associated with the first UI can send a signal to a control module associated with the second UI indicating the input at 606. The signal can include an instruction for the second UI to enter a locked mode. The locked mode can prevent and/or substantially prevent input being received into the locked UI.

FIG. 7 illustrates a flow diagram of a process 700 for overriding a locked mode on a merchant display of a point-of-sale (POS) system.

At 702, a POS system can present a first UI on a first display. In various examples, the first display can be one of two displays of the merchant device. In such examples, the first display can be either a merchant-facing display or a customer-facing display. In some examples, the first display can be a display specific to the device, such as a single display on a tablet configured to process POS transactions.

At 704, the POS system can present a second UI on a second display. In various examples, the second display can be a display associated with the merchant device. In some examples, the second display can be a display associated with a separate device from the device associated with the first display.

At 706, the POS system can receive an input via the second UI. The input can include input events, e.g., a user of the merchant device touching or simulating a touch by placing a finger in proximity to a presence-sensitive display, or by using a keyboard or other input mechanism. In various examples, the input can include a series of input events related to processing transactions via merchant application, such as processing payment for goods and/or services. In some examples, the input can include a series of input events related to entering customer data, such as during an establishment of a customer profile in a merchant reward program. In such examples, the customer data can be input by a merchant via a merchant interface and/or a customer via a customer interface.

At 708, in response to receiving the input, the POS system can cause the first UI to enter a locked mode. In some examples, the POS system can cause the first display to enter the locked mode. In various examples, a control module associated with the second user interface can send a signal to a control module associated with the first UI indicating the input at 706. The signal can include an instruction for the first UI to enter a locked mode. The locked mode can substantially prevent input being received into the locked UI.

At 710, the POS system can receive, via the first UI, an indication of an override of the locked mode. In various examples, the first UI can include an override selection interface element. For instance, an override selection button can provide a means by which a user associated with the first UI can exit the locked mode prior to completion of the input via the second UI. In various examples, the first UI and the second UI can include an override selection button. In some examples, the first UI, such as a merchant UI, can include an override selection button to override the locked mode, while the second UI, such as a customer UI, does not. In such examples, the merchant (or user associated with the first UI) may be able to maintain ultimate control of the transaction.

At 712, in response to receiving the indication of the override, the POS system can disengage the locked mode on the first display. In some examples, the control module associated with the first display can receive the indication of the override, and can disengage the locked mode. In various examples, the override of the locked mode on the first UI can cause the second UI to enter a locked mode. In such examples, the POS system may prevent simultaneous input of data via the first UI and the second UI.

FIG. 8 illustrates a flow diagram of a process 800 for a point-of-sale (POS) system to conduct concurrent transactions when a first user interface is in a locked mode.

At 802, a POS system can present a first UI and a second UI on a merchant-facing display. The merchant-facing display can be one of at least two displays associated with a merchant device, or it can be a single display associated with a merchant device.

At 804, the POS system can present a third UI on a customer-facing display. The customer-facing display can be one of at least two displays associated with a merchant device, or it can be a single display associated with a customer device.

At 806, the POS system can receive, via the third UI, an input from a first customer. The input can include input events, e.g., the customer touching or simulating a touch by placing a finger in proximity to a presence-sensitive display, or by using a keyboard or other input mechanism. In various examples, the input can include a series of input events related to processing transactions, such as processing payment for goods and/or services. In some examples, the input can include a series of input events related to entering customer data, such as during an establishment of a customer profile in a merchant reward program. In such examples, the customer data can be input by a merchant via a merchant interface and/or a customer via a customer interface.

At 808, responsive to receiving the input from the first customer, the POS system can cause the first UI to enter a locked mode. In some examples, a control module associated with the third UI can recognize the input by the first customer. The control module can send a signal to a control module associated with the first UI. The signal can include an instruction to cause the first UI to enter the locked mode, thereby substantially preventing input into the first UI.

At 810, the POS system can receive, via the second UI, input from the merchant. In some examples, the input can include a selection of an alternate transaction button. The alternate transaction button can be independent of the locked mode, and thus can be selected while the first UI is operating in the locked mode. In various examples, responsive to selection of the alternate transaction button, the first UI can be minimized and/or otherwise made smaller on the merchant display.

In various examples, the input can include a series of input events related to processing a second transaction with a second customer. In such examples, the input events can include transaction data (e.g., items purchased, cost, tax, gratuity, discounts, etc.), payment method data (e.g., credit card, debit card, cash, electronic fund transfer, etc.), merchant reward information, and any other information pertinent to the transaction.

At 812, the POS system can complete the second transaction with the second customer via the second UI. The merchant can receive payment from the second customer for goods and/or services rendered. The payment can be in the form of cash, debit card, credit card, gift card, electronic fund transfers, or other valid method of payment. The second UI can route the transaction data and payment information to the merchant application for processing of the second transaction. In some examples, the processing of the second transaction can be through a payment processing service. The merchant may continue to conduct concurrent transactions with customers while the first UI is locked. In various examples, the first UI and/or the second UI may receive a notification, such as via a control module, that the first customer is complete with the input via the customer interface. In such examples, the merchant may re-engage the first transaction via the first UI. In this way, a merchant may conduct multiple concurrent transactions with multiple customers via a single POS system while maintaining input integrity (e.g., preventing simultaneous input from two parties) between merchant-facing and consumer-facing displays, thereby improving the efficiency and functioning of the POS system.

Figure 9:
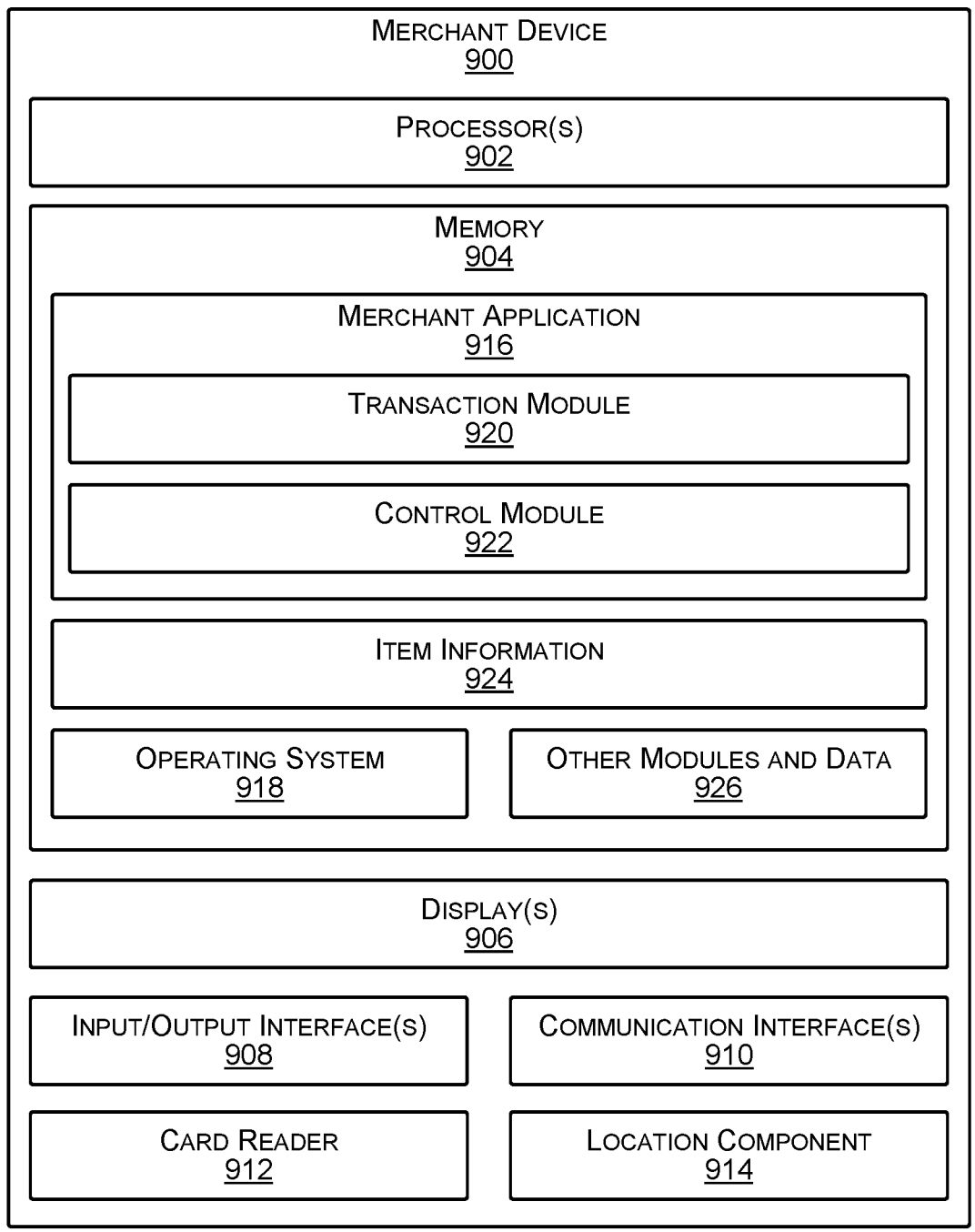
FIG. 9 illustrates select example components of a merchant device that a merchant may utilize in conducting a point-of-sale (POS) transaction with a customer, according to some implementations.

FIG. 9 illustrates select example components of an example merchant device 900 that a merchant may utilize in conducting a point-of-sale (POS) transaction with a customer, according to some implementations. The merchant device 900 can include a point-of-sale (POS) device used to facilitate POS transactions between a merchant and a customer. The merchant device 900 may be any suitable type of computing device, e.g., mobile, semi-mobile, semi-stationary, or stationary. Some examples of the merchant device 900 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the merchant device 900 includes at least one processor 902, at least one memory 904, at least one display 906, such as displays 102, 104, and 226, one or more input/output (I/O) interfaces 908, such as I/O interfaces 122, 222, and 224, one or more communication interfaces 910, such as communication interfaces 218 and 220, at least one card reader 912, such as payment card reader 118, and at least one location component 914.

Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the memory 904.

Depending on the configuration of the merchant device 900, the memory 904 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 904 may include, but is not limited to, RAM, ROM, EEPROM, flash memory, solid-state storage, magnetic disk storage, optical storage, and/or other computer-readable media technology. Further, in some cases, the POS device 900 may access external storage, such as RAID storage systems, storage arrays, network attached storage, storage area networks, cloud storage, or any other medium that can be used to store information and that can be accessed by the processor 902 directly or through another computing device or network. Accordingly, the memory 904 may be computer storage media able to store instructions, modules or components that may be executed by the processor 902. Further, when mentioned, non-transitory computer-readable media excludes media such as energy, carrier signals, electromagnetic waves, and signals per se.

The memory 904 may be used to store and maintain any number of functional components that are executable by the processor 902. In some implementations, these functional components comprise instructions or programs that are executable by the processor 902 and that, when executed, implement operational logic for performing the actions and services attributed above to the merchant device 900. Functional components of the merchant device 900 stored in the memory 904 may include a merchant application 916, such as merchant application 108 discussed above. The merchant application 916 may present a merchant interface on the merchant device 900 to enable the merchant to conduct transactions, select items, receive payments, and so forth, as well as communicate with a payment service for processing payments and sending transaction information. Further, the merchant application 916 may present a customer interface to enable the customer to input data on a customer display of the merchant device 900. Additional functional components may include an operating system 918 for controlling and managing various functions of the merchant device 900 and for enabling basic user interactions with the merchant device 900 and/or a customer device. The memory 904 may also store a transaction module 920 including transaction data that is received while the merchant is engaged in various transactions with customers. The memory 904 may also store a control module 922 configured to engage a locked mode on a user interface of the merchant device 900. The locked mode can prevent and/or substantially prevent input into the user interface during input of data via a second user interface.

In addition, the memory 904 may also store data, data structures and the like, that are used by the functional components. For example, this data may include item information 924 that includes information about the items offered by the merchant, which may include images of the items, descriptions of the items, prices of the items, and so forth. Depending on the type of the merchant device 900, the memory 904 may also optionally include other functional components and data 926, which may include programs, drivers, etc., and the data used or generated by the functional components. Further, the merchant device 900 may include many other logical, programmatic and physical components, of which those described are merely examples that are related to the discussion herein.

The one or more communication interface(s) 910 may include one or more interfaces and hardware components for facilitating communication with various other devices over a network or directly. For example, communication interface(s) 910 may facilitate communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 9 further illustrates that the merchant device 900 may include one or more displays 906 mentioned above. Depending on the type of computing device used as the merchant device 900, the one or more displays 906 may employ any suitable display technology. For example, the one or more displays 906 may be liquid crystal displays, plasma displays, light emitting diode displays, OLED (organic light-emitting diode) displays, electronic paper displays, or any other suitable type of displays able to present digital content thereon. In some examples, the one or more displays 906 may have a touch sensor associated therewith to provide touchscreen displays configured to receive touch inputs for enabling interaction with graphical user interfaces presented on the displays 906 (e.g., merchant UI, customer UI, etc.). Accordingly, implementations herein are not limited to any particular display technology.

The I/O interfaces 908, meanwhile, may include speakers, a microphone, a camera, and various user controls (e.g., buttons, a joystick, a keyboard, a keypad, etc.), a haptic output device, and so forth.

In addition, the merchant device 900 may include or may be connectable to a card reader 912. In some examples, the card reader 912 may plug in to a port in the merchant device 900, such as a microphone/headphone port, a data port, or other suitable port. In other instances, the card reader 912 is integral with the entire merchant device 900. The card reader 912 may include a read head for reading a magnetic strip, a chip and/or a proximity sensor of a payment card, and further may include encryption technology for encrypting the information read from the magnetic strip, the chip and/or the proximity. Alternatively, numerous other types of card readers may be employed with the merchant devices 900 herein, depending on the type and configuration of a particular merchant device 900.

The location component 914 may include a GPS device able to indicate location information, or the location component 914 may comprise another other location-based sensor. The merchant device 900 may also include one or more additional sensors (not shown), such as an accelerometer, gyroscope, compass, proximity sensor, and the like. Additionally, the merchant device 900 may include various other components that are not shown, examples of which include removable storage, a power control unit, and so forth.

Figure 10:
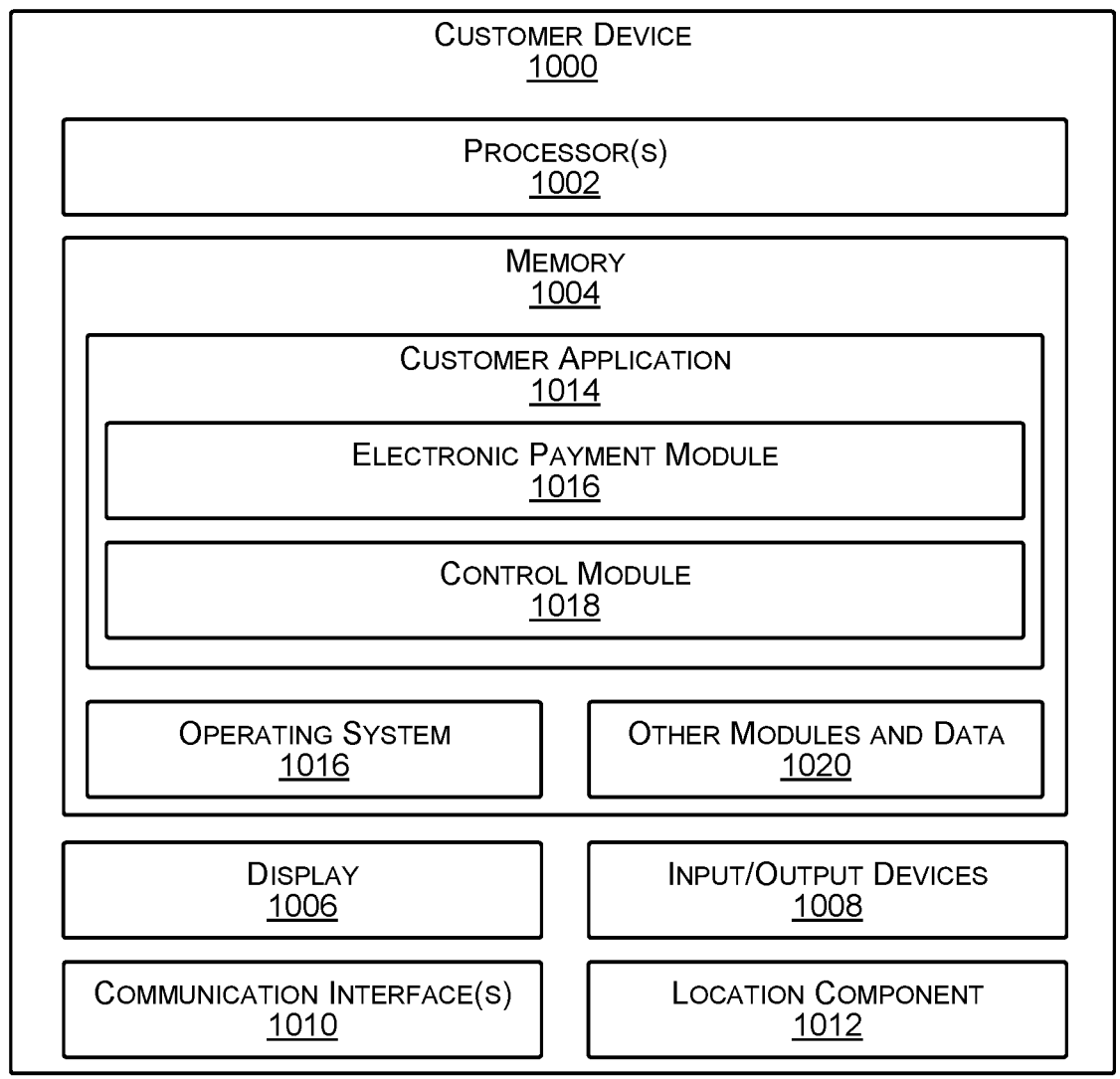
FIG. 10 illustrates select example components of a customer device that a customer may utilize in conducting a transaction with a merchant, according to some implementations.

FIG. 10 illustrates select example components of a customer device that a customer may utilize in conducting a transaction with a merchant, according to some implementations. The customer device 1000 may be any suitable type of computing device, e.g., mobile, semi-mobile, semi-stationary, or stationary. Some examples of the customer device 1000 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the customer device 1000 includes at least one processor 1002, at least one memory 1004, a display 1006, such as display 214, one or more input/output (I/O) interfaces 1008, such as I/O interfaces 222, one or more communication interfaces 1010, and at least one location component 1012. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the memory 1004.

Depending on the configuration of the customer device 1000, the memory 1004 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 1004 may include, but is not limited to, RAM, ROM, EEPROM, flash memory, solid-state storage, magnetic disk storage, optical storage, and/or other computer-readable media technology. Further, in some cases, the customer device 1000 may access external storage, such as RAID storage systems, storage arrays, network attached storage, storage area networks, cloud storage, or any other medium that can be used to store information and that can be accessed by the processor 1002 directly or through another computing device or network. Accordingly, the memory 1004 may be computer storage media able to store instructions, modules or components that may be executed by the processor 1002. Further, when mentioned, non-transitory computer-readable media exclude media such as energy, carrier signals, electromagnetic waves, and signals per se.

The memory 1004 may be used to store and maintain any number of functional components that are executable by the processor 1002. In some implementations, these functional components comprise instructions or programs that are executable by the processor 1002 and that, when executed, implement operational logic for performing the actions and services attributed above to the customer device 1000. Functional components of the customer device 1000 stored in the memory 1004 may include a customer application 1014, such as customer application 212. The customer application 1014 may present an interface on the customer device 1000 to enable the customer to conduct transactions with a merchant, such as by selecting items and sending payment information. Additional functional components may include an operating system 1016 for controlling and managing various functions of the customer device 1000 and for enabling basic user interactions with the customer device 1000. The memory 1004 may also store an electronic payment module 1018 configured to access electronic payment and provide the payment to a merchant device, such as merchant device 900.

The memory 1004 may also store a control module 1018 configured to engage a locked mode on a user interface of the customer device 1000 and/or a merchant device. For example, the control module 1018 can receive an indication of input via the one or more I/O devices 1008, and can send a signal (e.g., a message of input) corresponding to the input to a control module of a merchant device. Responsive to receiving the signal, the control module of the merchant device can cause the merchant device to enter a locked mode. For another example, the control module 1018 can receive an indication of input on an I/O interface of the merchant device. Responsive to receiving the indication of input, the control module 1018 can cause the customer device 1000 to enter a locked mode.

Depending on the type of the customer device 1000, the memory 1004 may also optionally include other modules and data 1020, which may include programs, drivers, etc., and the data used or generated by modules. Further, the customer device 1000 may include many other logical, programmatic and physical components, of which those described are merely examples that are related to the discussion herein.

The one or more communication interface(s) 1010 may include one or more interfaces and hardware components for facilitating communication with various other devices over a network or directly. For example, communication interface(s) 1010 may facilitate communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 10 further illustrates that the POS device 1000 may include the display 1006 mentioned above. Depending on the type of computing device used as the POS device 1000, the display 1006 may employ any suitable display technology. For example, the display 1006 may be a liquid crystal display, a plasma display, a light emitting diode display, an OLED (organic light-emitting diode) display, an electronic paper display, or any other suitable type of display able to present digital content thereon. In some examples, the display 1006 may have a touch sensor associated with the display 1006 to provide a touchscreen display configured to receive touch inputs for enabling interaction with a graphical user interface presented on the display 1006. Accordingly, implementations herein are not limited to any particular display technology.

The I/O interfaces 1008, meanwhile, may include speakers, a microphone, a camera, and various user controls (e.g., buttons, a joystick, a keyboard, a keypad, etc.), a haptic output device, and so forth.

The location component 1012 may include a GPS device able to indicate location information, or the location component 1012 may comprise another other location-based sensor. The customer device 1000 may also include one or more additional sensors (not shown), such as an accelerometer, gyroscope, compass, proximity sensor, and the like. Additionally, the customer device 1000 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A point-of-sale (POS) system used in performing POS transactions between a customer and a merchant, the POS system comprising:
   a customer terminal having a customer POS interface configured to receive input from the customer during a POS transaction with the merchant;
   a merchant terminal having a merchant POS interface configured to receive input from the merchant during the POS transaction with the customer;
   an interface control mechanism;

one or more processors; and
one or more non-transitory computer-readable media storing instructions executable by the one or more processors, wherein the instructions program the one or more processors to perform acts comprising:
for a specific transaction between the customer and the merchant:
determining, by the interface control mechanism, an indication of interaction with the customer POS interface of the customer terminal;
enabling, by the interface control mechanism and based at least in part on the determining, the merchant POS interface of the merchant terminal to standby to receive input from the customer via the customer POS interface, wherein enabling the merchant POS interface to standby to receive the input comprises causing, by the interface control mechanism, a locked mode of the merchant POS interface to engage;
enabling, by the interface control mechanism, the customer to provide the input via the customer POS interface on the customer terminal while the merchant POS interface stands by for the input from the customer; and
in response to determining that the customer POS interface has received the input, enabling, by the interface control mechanism, the merchant POS interface of the merchant terminal to complete the specific transaction, wherein enabling the merchant POS interface to complete the specific transaction comprises causing, by the interface control mechanism, the locked mode of the merchant POS interface to disengage.

2. The POS system as claim 1 recites, wherein:
the input received via the customer POS interface comprises authorization information corresponding to a payment card associated with the customer.

3. The POS system as claim 1 recites, the acts further comprising:
designating the customer terminal as a control terminal; and
wherein enabling the merchant POS interface of the merchant terminal to standby is based at least in part on the customer terminal being designated as the control terminal.

4. A method for processing a point-of-sale (POS) transaction between a customer and a merchant, the method comprising:
determining, by an interface control mechanism of a POS system, an indication of interaction with a customer POS interface of a customer terminal of the POS system;
enabling, by the interface control mechanism and based at least in part on the determining, a merchant POS interface of a merchant terminal of the POS system to stand by to receive input from the customer via the customer POS interface, wherein enabling the merchant POS interface to stand by to receive the input comprises causing, by the interface control mechanism, a locked mode of the merchant POS interface to engage;
enabling, by the interface control mechanism, the customer to provide the input via the customer POS interface of the customer terminal while the merchant POS interface stands by for the input; and
in response to determining that the customer POS interface has received the input, enabling, by the interface control mechanism, the merchant POS interface of the merchant terminal to complete the POS transaction, wherein enabling the merchant POS interface to complete the POS transaction comprises causing the locked mode of the merchant POS interface to disengage.

5. The method as claim 4 recites, wherein causing the locked mode of the merchant POS interface to engage comprises:
receiving, by the merchant POS interface, an instruction to enter the locked mode.

6. The method as claim 4 recites, further comprising:
determining that the input comprises sensitive information, wherein causing the merchant POS interface to stand by to receive the input is based at least in part on the input comprising sensitive information.

7. The method as claim 4 recites, wherein:
the input received via the customer POS interface comprises authorization information corresponding to a payment card associated with the customer.

8. The method as claim 4 recites, wherein the input is a first input, the method further comprising:
determining that the customer POS interface is receiving the first input; and based at least in part on the customer POS interface receiving the first input associated with the POS transaction, enabling the merchant POS interface to receive a second input associated with an action separate from the POS transaction.

9. The method as claim 4 recites, further comprising causing a representation of the input to surface via the merchant POS interface.

10. The method as claim 4 recites, wherein determining that the customer POS interface has received the input comprises at least one of:
receiving a first message including the input; or
receiving a second message indicating completion of the input.

11. The method as claim 4 recites, wherein the input comprises a first input, the method further comprising:
determining that the merchant POS interface is receiving a second input; and
based at least in part on the second input, causing the customer POS interface to enter the locked mode.

12. A service computing device comprising:
one or more processors; and
one or more computer-readable media storing instructions that, when executed by the one or more processors, cause the one or more processors to perform operations comprising:
for a point-of-sale (POS) transaction between a customer and a merchant:
determining, by an interface control mechanism, an indication of interaction with a customer POS interface of a customer terminal;
enabling, by the interface control mechanism and based at least in part on the determining, a merchant POS interface of a merchant terminal to stand by to receive input from the customer via the customer terminal having the customer POS interface, wherein enabling the merchant POS interface to stand by to receive the input comprises causing, by the interface control mechanism, a locked mode of the merchant POS interface to engage;
enabling, by the interface control mechanism, the customer to provide the input via the customer POS interface of the customer terminal while the merchant POS interface stands by for the input; and
in response to determining that the customer POS interface has received the input, enabling, by the interface control mechanism, the merchant POS interface of the merchant terminal to complete the POS transaction, wherein enabling the merchant POS interface to complete the POS transaction comprises causing, by the interface control mechanism, the locked mode of the merchant POS interface to disengage.

13. The service computing device as claim 12 recites, wherein:
the input received via the customer POS interface comprises payment information to satisfy a cost of the POS transaction between the customer and the merchant.

14. The service computing device as claim 13 recites, wherein the payment information comprises at least one of:
a personal identification number corresponding to a payment card associated with the customer;
an identifier associated with the payment card; or
a signature associated with the customer.

15. The service computing device as claim 12 recites, wherein:
the merchant POS interface is associated with first display of a merchant POS device; and
the customer POS interface is associated with a second display of the merchant POS device.

16. The service computing device as claim 12 recites, wherein the input received via the customer POS interface comprises authorization information corresponding to a payment card associated with the customer.

17. The service computing device as claim 12 recites, the operations further comprising:
determining that the input comprises sensitive information, wherein causing the merchant POS interface to stand by to receive the input is based at least in part on the input comprising sensitive information.

18. The service computing device as claim 12 recites, wherein the input comprises a first input, the operations further comprising:
determining that the merchant POS interface is receiving a second input; and based at least in part on the second input, causing the customer POS interface to enter the locked mode.

19. The service computing device as claim 12 recites, wherein the input is a first input, the operations further comprising:
determining that the customer POS interface is receiving the first input; and
based at least in part on the customer POS interface receiving the first input associated with the POS transaction, enabling the merchant POS interface to receive a second input associated with an action separate from the POS transaction.

20. The service computing device as claim 12 recites, wherein determining that the customer POS interface has received the input comprises at least one of:
receiving a first message including the input; or
receiving a second message indicating completion of the input.

* * * * *